US009397958B2

(12) United States Patent
Wenig et al.

(10) Patent No.: US 9,397,958 B2
(45) Date of Patent: *Jul. 19, 2016

(54) FCOE VN_PORT VIRTUALIZER

(71) Applicant: Brocade Communications Systems, Inc., San Jose, CA (US)

(72) Inventors: Glenn Wenig, Pleasanton, CA (US); Howard Johnson, Louisville, CO (US); Daniel Chung, San Jose, CA (US); Dave Peterson, Princeton, MN (US)

(73) Assignee: Brocade Communications Systems, Inc., San Jose, CA (US)

(*) Notice: Subject to any disclaimer, the term of this patent is extended or adjusted under 35 U.S.C. 154(b) by 89 days.

This patent is subject to a terminal disclaimer.

(21) Appl. No.: 14/206,946

(22) Filed: Mar. 12, 2014

(65) Prior Publication Data

US 2014/0301402 A1 Oct. 9, 2014

Related U.S. Application Data

(60) Provisional application No. 61/808,289, filed on Apr. 4, 2013.

(51) Int. Cl.
*H04L 12/741* (2013.01)
*H04L 12/933* (2013.01)
*H04L 12/931* (2013.01)
*H04L 12/947* (2013.01)

(52) U.S. Cl.
CPC ..................................... *H04L 49/25* (2013.01)

(58) Field of Classification Search
None
See application file for complete search history.

(56) References Cited

U.S. PATENT DOCUMENTS

| 7,707,309 | B2 | 4/2010 | Shanbhag | |
|---|---|---|---|---|
| 7,760,717 | B2 | 7/2010 | Atkinson | |
| 2009/0245791 | A1 | 10/2009 | Thaler | |
| 2011/0268120 | A1* | 11/2011 | Vobbilisetty | H04L 45/46 370/392 |
| 2011/0268125 | A1 | 11/2011 | Vobbilisetty | |
| 2011/0286357 | A1 | 11/2011 | Haris | |
| 2011/0292947 | A1 | 12/2011 | Vobbilisetty | |
| 2011/0299391 | A1 | 12/2011 | Vobbilisetty | |
| 2011/0299535 | A1 | 12/2011 | Vobbilisetty | |
| 2012/0155469 | A1* | 6/2012 | Majumdar | H04L 45/26 370/392 |
| 2012/0163391 | A1* | 6/2012 | Shukla | H04L 45/24 370/401 |
| 2012/0163395 | A1* | 6/2012 | Shukla | H04L 12/56 370/409 |
| 2013/0148663 | A1* | 6/2013 | Xiong | H04L 45/745 370/392 |
| 2014/0003440 | A1* | 1/2014 | Hathorn | H04L 67/1097 370/401 |

OTHER PUBLICATIONS

Juniper Networks, Understanding FIP Implementation, Juniper website, Mar. 23, 2012, pp. 1-3.
Juniper Networks, FCOE Convergence at the Access Layer with Juniper Networks QFX3500 Switch, Jul. 2011, pp. 1-14.
Hewlett-Packard Development Corp., L.P., HP 5920 & 5900 Switch Series FCoE Configuration Guide, Jan. 30, 2013, pp. 1-104.

(Continued)

*Primary Examiner* — Brandon Renner
(74) *Attorney, Agent, or Firm* — Blank Rome, LLP

(57) ABSTRACT

An FCoE VN_Port virtualizer where VF_Ports are used to connect downstream to host and target VN_Ports and a VN_Port is used to connect upstream to further FCoE VN_Port virtualizers or to an FCF. An alternate embodiment uses an Ethernet Fabric for an additional purpose. The Ethernet Fabric devices all act as FCoE VN_Port virtualizers, so that the Ethernet Fabric itself is considered a virtual FCoE VN_Port virtualizer.

16 Claims, 11 Drawing Sheets

(56) References Cited

OTHER PUBLICATIONS

Hewlett-Packard Development Corp., L.P., HP 5920 & 5900 Switch Series FCoE Configuration Guide, Dec. 23, 2013, pp. 1-116.

Hewlett-Packard Development Corp., L.P., HP 5920 & 5900 Switch Series FC and FCoE Configuration Guide, Jan. 17, 2014, pp. 1-244.

Hewlett-Packard Development Corp., L.P., HP 5920 & 5900 Switch Series FCoE Command Reference, Jan. 10, 2013, pp. 1-96.

Hewlett-Packard Development Corp., L.P., HP 5920 & 5900 Switch Series FCoE Command Reference, Dec. 23, 2013, pp. 1-97.

Hewlett-Packard Development Corp., L.P., HP 5920 & 5900 Switch Series FCoE Command Reference, Jan. 17, 2014, pp. 1-141.

Fibre Channel—Fabric Generic Requirements (FC-FG), ANSI X3.289-1996, Dec. 4, 1996, pp. Front cover—23.

Fibre Channel Switch Fabric—6 (FC-SW-6) Rev 1.4, Nov., 26, 2013, pp. Front cover—33, 269-319.

Fibre Channel Backbone—6 (FC-BB-6) Rev. 2.00, Dec. 3, 2013, pp. Front cover—32, 87-164, 166.

\* cited by examiner

FCOE VN_PORT VIRTUALIZER

CROSS REFERENCE TO RELATED APPLICATIONS

This application claims the benefit under 35 U.S.C. §119 (e) of U.S. Provisional Patent Application Ser. No. 61/808,289 entitled "FCoE VN_Port Virtualizer," filed Apr. 4, 2013, which is hereby incorporated by reference.

This application is related to patent application Ser. No. 14/206,879, filed concurrently herewith, entitled "FCoE VN_Port to FC N_Port Operations in an Ethernet Fabric," which is hereby incorporated by reference.

BACKGROUND OF THE INVENTION

1. Field of the Invention

The invention relates to network devices.

2. Description of the Related Art

One limitation of Fibre Channel (FC) is the practical number of domains or switches that can be present in a fabric. Another concern with FC is the amount of time required to reconfigure the fabric on removal or addition of a new switch. To address these points, a system and method as described in U.S. Pat. No. 7,707,309, entitled "Isolation Switch for Fibre Channel Fabrics in Storage Area Networks" was developed. In that design a switch is connected to hosts in the usual manner but is connected to an FC fabric using N_Port ID Virtualization (NPIV) ports, with one NPIV address for each connected host. The switch translated addresses between those provided to the host and those assigned using the NPIV process. U.S. Pat. No. 7,577,134, entitled "Port Expander for Fibre Channel Fabrics in Storage Area Networks" improved on the design of the '309 patent by passing the NPIV addresses directly to the connected hosts, removing the translation step.

Another concern in FC has been the relatively high cost of the host bus adapters (HBAs) and the switches, particularly as compared to the corresponding Ethernet network interface cards (NICs) and switches and routers. To that end a technology called Fibre Channel over Ethernet (FCoE) has been developed. Basically an FC packet is encapsulated in an Ethernet packet and transferred through a data center Ethernet network. In an FCoE environment, a host or Enode uses either a converged network adapter (CNA), which receives FC packets and encapsulates them itself, or an FCoE driver, which receives the FC packets, converts them to FCoE packets and then provides those to a normal NIC. The FCoE packets are provided to a Fibre Channel Forwarder (FCF), which is a device that is connected to both the Ethernet network and an FC fabric. The FCF receives FCoE packets, converts them to FC packets and then provides them to the FC fabric using an E_Port or fabric port. The FCF acts as a normal FC switch, performing fabric login operations and the like and consumes a domain. In the opposite direction, from storage device to host, the FCF receives the FC packets from the storage unit, converts them to FCoE packets and provides them to the Ethernet network, where they are delivered to the host. The FCoE subsystem of the host, either a CNA or a driver and NIC, convert the FCoE packets to FC packet data, which the host then processes. While this approach addresses a cost issue, it does nothing to address the number of switches problem of FC as each FCF consumes another domain.

One approach to address that concern has been the development of the FCoE to FC gateway, essentially the combination of an FCF and the above mentioned Port Expander. The FCoE to FC gateway connects to the FC fabric using NPIV ports, as discussed above. The FCF portion of the gateway terminates the FCoE network by providing a VF_Port. Internally the FC packets are obtained but then they are provided to the NPIV port for transmission through the FC fabric. The FC portion of the gateway behaves just as the NPIV port of the port expander, except that it is connected internally to an FCoE port rather than an F_Port. This addresses the domain count concern but still requires each FCoE packet to be routed through the Ethernet network to the specific FCoE to FC gateway, as only that one unit has the needed information to perform the necessary packet operations.

In a different area, the number of hosts used in a data center has been increasing dramatically, particularly with the advent of virtual machine (VM) usage. As each VM consumes a MAC address and usually an IP address, transferring packets inside a data center has been problematic as complex router structures are needed to handle the very large number of IP addresses, as only 256 IP addresses can be present on one subnet. These 256 IP addresses can easily be met by a single blade server chassis. The very large number of addresses or connections, virtual or physical, also creates fundamental routing problems as Ethernet uses a spanning tree protocol (STP) for routing to prevent loops. However, using STP results in many non-optimal routes and difficulty in providing load balancing and multipath benefits. To address these issues Ethernet Fabrics have been developed, primarily based on TRILL, to handle the routing at the layer 2 level and to allow load balancing, multipathing and optimal or shortest path routing. One such Ethernet Fabric is the VCS architecture provided by Brocade Communications Systems, Inc.

If an FCoE to FC gateway is used with an Ethernet Fabric, the single point of connection, the FCoE to FC gateway, remains a problem and to an extent reduces the value of the basic improvements provided by the Ethernet Fabric. Further, an FCoE to FC gateway is to a great extent duplicative of an FCF, which may also be present in an FCoE/FC environment, so the FCoE to FC gateway may provide additional cost.

A problem that has developed in FCoE and has not been resolved despite many attempts, is the handling of peer-to-peer FCoE communication. For various reasons, in an FCoE environment that includes an FC fabric, all packets must travel to the FC fabric. Thus, any FCoE packet intended for another FCoE device on the same Ethernet network must still travel to the FC fabric and then back. Much debate has occurred, but an acceptable problem has not been determined.

SUMMARY OF THE INVENTION

Embodiments according to the present invention provide an FCoE VN_Port virtualizer. In the FCoE VN_Port virtualizer VF_Ports are used to connect downstream to host and target VN_Ports and a VN_Port is used to connect upstream to further FCoE VN_Port virtualizers or to an FCF. An alternate embodiment uses the Ethernet Fabric for an additional purpose. The Ethernet Fabric devices all act as FCoE VN_Port virtualizers, so that the Ethernet Fabric itself is considered a virtual FCoE VN_Port virtualizer.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1:
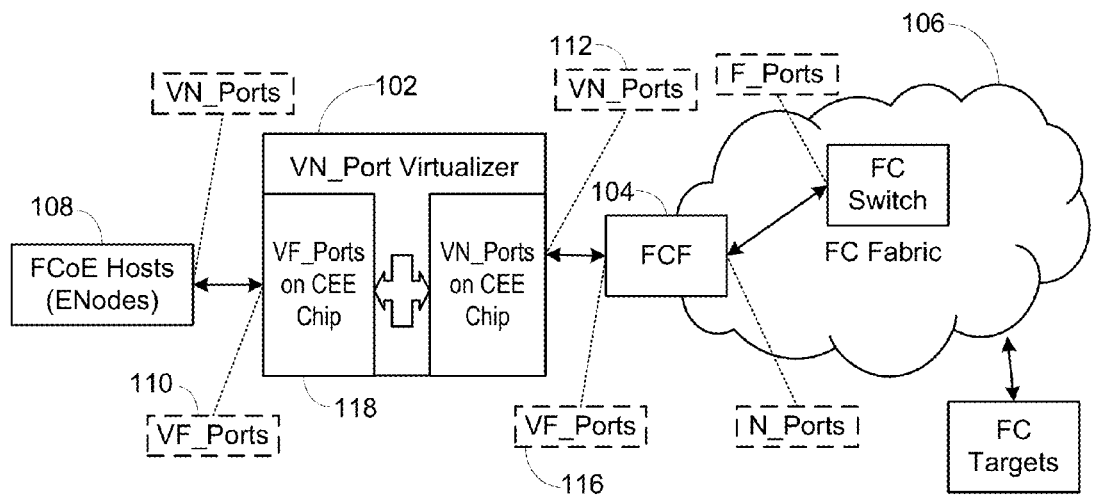
FIG. 1 is a block diagram of an FCoE VN_Port virtualizer according to the present invention.

As shown in FIG. 1, an FCoE VN_Port virtualizer (FVV: FCoE VN_Port Virtualizer) 102 connects to an FCF 104 which is connected to an FC fabric or storage area network (SAN) 106. The FVV 102 runs a limited lightweight stack of FCoE services without using a domain, dedicated or shared, from the SAN. An FVV 102 provides NPIV services for FCoE devices and does not directly connect to an FC SAN 106.

An FVV 102 works as an N_Port virtualizer (NPIV) between ENode devices 108 attached to it and the FCF 104 or further FVVs 102 to which it connects. The port types supported on the FVV 102 are VF_Ports 110 and VN_Ports 112. The VF_Ports 110 are created logically on top of physical CEE interfaces and provide FCoE Initialization Protocol (FIP) VLAN Discovery and FIP Discovery services to the attached devices. The ENode devices 108 do not directly log into the FVV 102, rather the FVV 102 converts any F Port Logins (FLOGIs) to FDISCs (Discover F Port Parameters) and forwards all FDISCs to the connected FCF 104. The VN_Port 112 of the FVV 102 performs its own FIP Discovery and FLOGI operations with the FCF 104 to establish the base VN_Port. VF_Ports 110 on the FVV support NPIV capability in their own right, which provides potential for two levels of NPIV, one to the VF_Port 110 and one from the VF_Port 116 on the FCF 104.

User defined mappings associate VF_Ports 110 with VN_Ports 112 on the FVV 102. Since VN_Ports 112 have a 1:1 physical connection to either a VF_Port 116 on an FCF 104 or on another FVV 102, this VF—VN association on the FVV 102 determines which fabric switch F_Port an ENode device 108 logs into. A VN_Port 112 on the FVV 102 logs into the FCF 104 or FVV 102 VF_Port 110 as a base NPIV device and gets assigned an FC-ID. The ENode devices 108 on the FVV 102 which login through this VN_Port 112 are also treated as subsequent NPIV logins on the FCF 104 or FVV 102 VF_Port 110. Thus, the ENode devices 108 obtain their FC-IDs from the FCF 104.

Device FLOGIs received on VF_Ports 110 are trapped and sent to an FCF 104 as FDISCs. Thus, each FCF 104 VF_Port 116 receives an FLOGI sent by the FVV 102 VN_Port 112 and then subsequent FDISCs sent on behalf of the ENode devices 108 or potentially other FVVs 102. The FIP and FLOGI exchange over an FVV 102 is outlined in FIG. 2.

Figure 2:
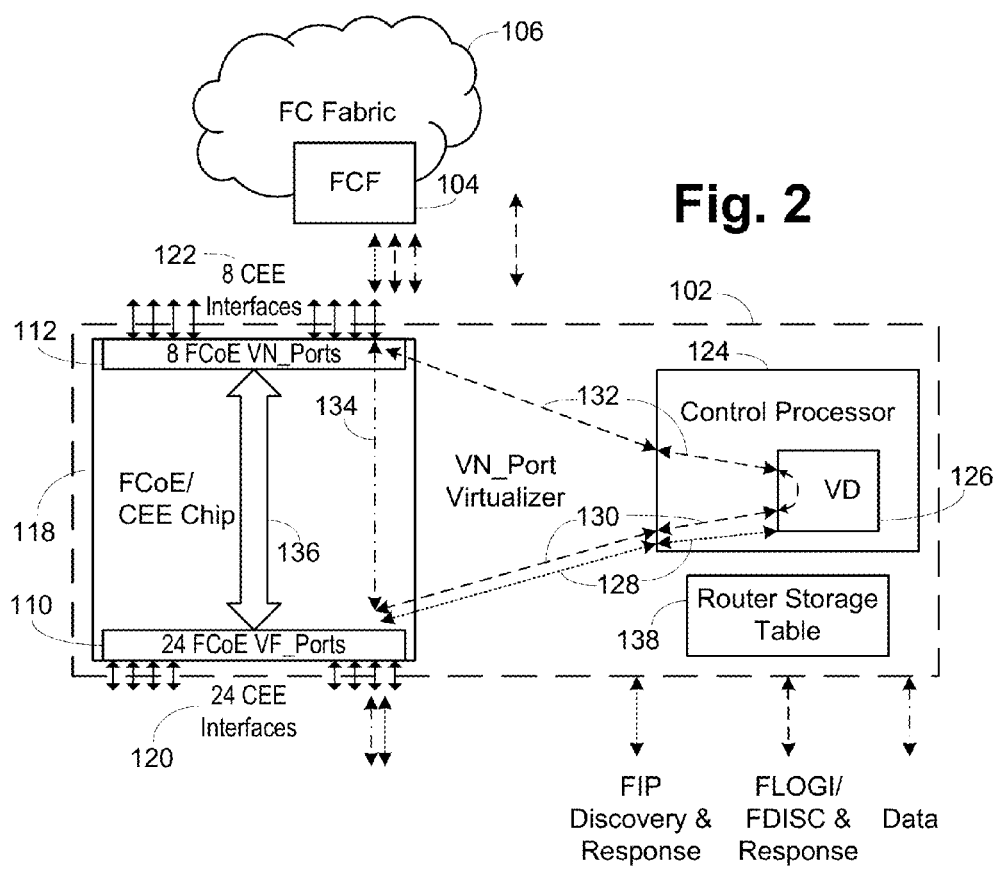
FIG. 2 is a block diagram of the information flow in the FCoE VN_Port virtualizer of FIG. 1.

FIG. 2 shows an FVV 102 with a Converged Enhanced Ethernet (CEE) chip 118 with 24 CEE interfaces 120 configured as VF_Ports 110 and 8 CEE interfaces 122 configured as VN_Ports 112. The VF_Ports 110 and VN_Ports 112 are created on top of CEE interfaces. Thus there are 24 VF_Ports 110 and 8 VN_Ports 112 on the FVV 102 shown in FIG. 2. Interconnect 136 is a switching fabric that allows packet transfer between the various CEE interfaces 120, 122 as appropriate. CP 124 is the core or control processor on the FVV 102. Packets may be forwarded to the CP 124 from the CEE interfaces and the CP 124 can provide packets to the CEE interfaces 120, 122 using either the interconnect 136 or through sideband connections, neither of which are shown for simplicity. A Virtualizer Daemon (VD) 126 is a user space or similar software module which implements and controls the FVV mode and runs on the CP 124. Routing table storage 138 is provided for use by the CEE chip 118 and the CP 124. The tables in the routing table storage 138 are discussed in more detail below.

As shown in FIG. 2, FIP VLAN and FCF discovery and responses are trapped by the VF_Ports 110 and forwarded for handling by the VD 126 simulating an FCF 104 as indicated by dashed lines 128. In the next phase the device FIP FLOGIs/FDISCs are trapped on the VF_Ports 110 and sent to the VD 136 as shown by dashed lines 130. The VD 126 converts FLOGIs to FDISCs, as an initial FLOGI will have occurred on FVV 102 startup, and sends the FDISCs to the FCF 104 over the appropriate mapped VN_Ports 112 as shown by the dashed lines 132. This involves creating a new FCoE packet for the FIP FDISC and copying over the device FIP FLOGI into it. Thus, the VD 126 on the FVV 102 maintains device login database and performs login translation. The FIP FDISC responses from the FCF 104 are trapped on the ingress VN_Ports 112 by the VD 126. These may need to be converted to FIP FLOGI responses, as necessary. These are copied into new FCoE packets and sent to the ENode devices 108. A FIP FDISC response from the FCF 104 contains the FC-ID for the device 108, thus the device 108 now has a PID assigned. For example, an FVV 102 VN_Port 112 performs FIP FLOGI to the FCF 104 and receives a base FC-ID of 0x010100. All subsequent device logins through this VN_Port 112 receive FC-IDs as 0x010101, 0X010102 etc.

This FIP FDISC response from the FCF 104 is the trigger for setting up routes for the data path on the FVV 102. FLOGI and subsequent data frames from the device 108 use the data path 134 (shown via dash and dot lines in FIG. 2). Once an ENode device 108 has logged into the FC Fabric, the FVV 102 simply works as a pass-through module for data frames.

The data path 134 utilizes Virtual Fabric Routing (VFR) within the switch. Data frames are moved between the CEE interfaces with FCoE header editing performed in the process.

The FVV 102 runs a significantly reduced set of FC Fabric services and these are managed by the VD 126. For example, FC Name Server and FC Management Server do not run on FVV 102. The VD 126 on the FVV 102 communicates with Fabric Services on an FCF 104 using FC-GS exchanges such as GMAL, GFN, RPAB, etc.

The FVV 102 provides graceful Failover/Failback for devices if the FCoE VN_Port 112 links go down.

FIGS. 3, 3A and 4-8 illustrate Ethernet Fabric operations according to the present invention. The preferred embodiment uses the VCS architecture from Brocade Communications Systems, Inc. More details on the VCS architecture are provided in U.S. Patent Application Publication Nos. 2011/0299391, 2011/0286357, 2011/0268125, 2011/0299535, 2011/0268120, and 2011/0292947, which are hereby incorporated by reference.

In the preferred embodiment an Ethernet Fabric 302 provides:

Support for NPIV-based VN_Port to VF_Port bridging between FCoE devices 306 attached to the Ethernet Fabric 302 and the FCFs 308, Access to FCoE targets from a single ENode interface, and The preferred embodiment permits the Ethernet Fabric 302 to be viewed as a single FCoE VN_Port virtualizer (FVV). In addition, from the FCoE device point of view, the fabric appears as a single logical FVV. All Ethernet Fabric switches, also known as RBridges or RBs, 304 use the same external FVV MAC address.

The Ethernet Fabric 302 handles the FIP protocol processing and the FCoE encapsulation between the Ethernet Fabric 302 and the FCFs 308, but all SAN fabric services are provided by the FC SAN fabric 310.

Figure 3:
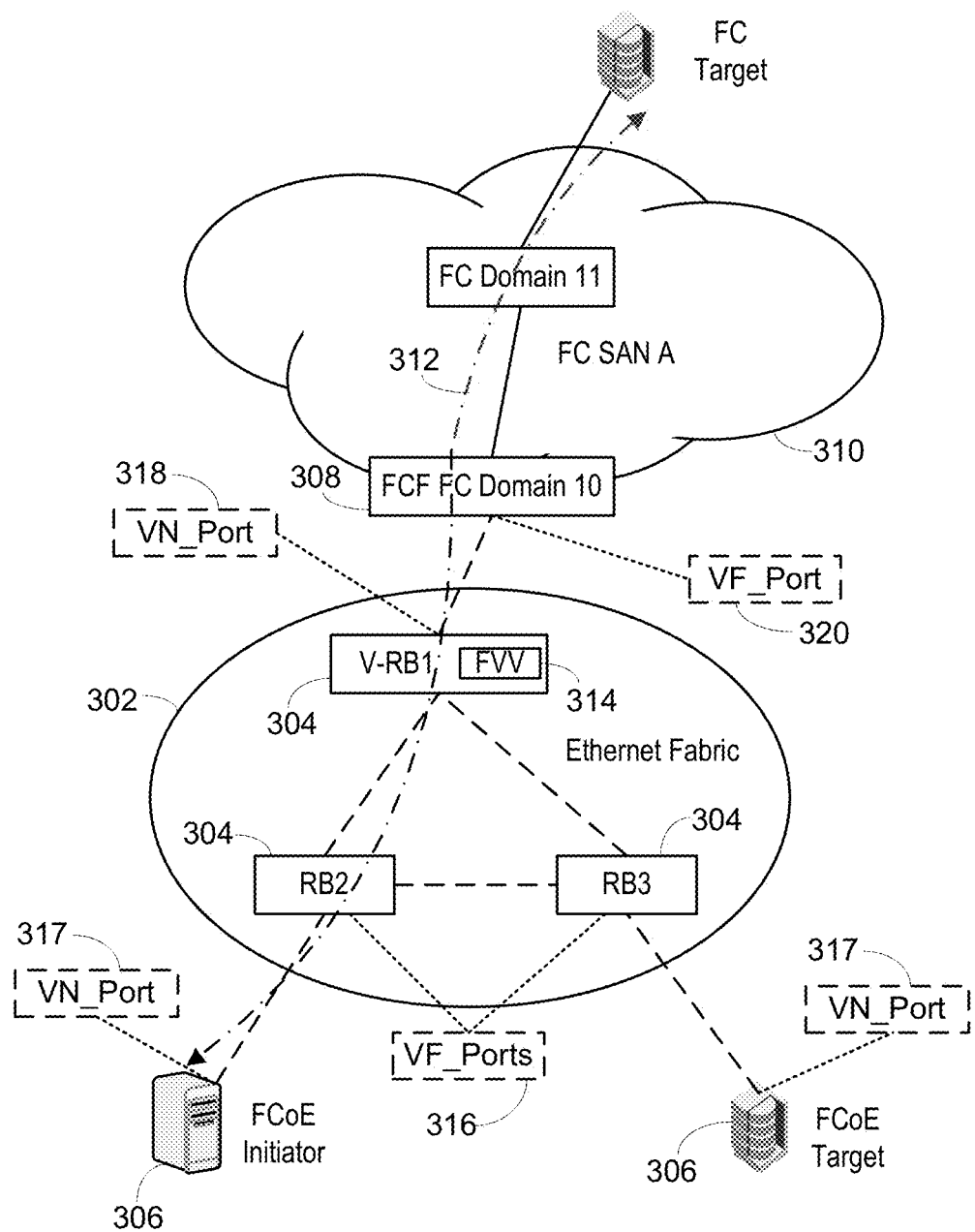
FIG. 3 is a block diagram of a network including an Ethernet Fabric according to the present invention.

Traffic between FCoE VN_Ports 317 on ENode devices 306 and FCF 308 VF_Ports 320 is bridged by an FVV switch functionality 314 embedded in an RBridge or Ethernet Fabric switch 306 connected directly to the FCF 308 via an FCoE VN_Port 316 to FCoE VF_Port 320 link. However, traffic between FCoE VN_Ports 317 and FCoE VN_Ports 318 is not forwarded to the FC Fabric for routing, it is TRILL forwarded directly from the ingress Ethernet Fabric switch 304 to the egress Ethernet Fabric switch 304 as shown in FIG. 3. The RBs or Ethernet Fabric switches are interconnected using Ethernet Fabric ports.

For the sake of clarity, we need to distinguish between the two types of Ethernet Fabric switches that may exist in this model. An Ethernet Fabric switch (RB for RBridge) that includes FVV functionality and is directly connected to an FCF is called a V-RB switch, for Virtualizer-RBridge, in this document (V-RB1 304 in FIG. 3) as they contain embedded FVV functionality.

Ethernet Fabric switches 304 (RB for RBridge) provide the following services:

FIP discovery and VLAN services for FCoE devices attached to this switch;

FIP login redirection to appropriate FCF; and

Via Ethernet Name Server (eNS) distribution services, which is used to maintain coherency of information among the various RBs as discussed in Publication No. 2011/0299535 incorporated above, notify all other RBs of link establishment, status, etc. and FCoE VN_Port additions and deletions.

At a high level, the forwarding logic for a received FCoE frame is:

Promote to L3;

Perform 24 bit lookup on FC DID;

Perform 16 bit (Domain, Area) lookup on FC SID;

If (24 bit lookup=hit):

Result=Forward to egress RB (or egress interface if egress RB=self);

Else (if 16 bit lookup=hit):

Result=Forward to egress V-RB (or egress interface if egress V-RB=self);

Else:

Drop or reject packet.

In order to facilitate the direct forwarding of FCoE to FCoE traffic from ingress RB to egress RB in the Ethernet Fabric, each RB in the Ethernet Fabric has knowledge of every FCoE VN_Port attached to fabric, similar to the Ethernet Fabric model for L2 Ethernet MAC addresses as discussed in related application Ser. No. 14/206,879 incorporated above.

When an FCoE Enode device successfully logs in to the FC SAN, the egress RB traps the FIP login response and updates all RBs of the new device's FPMA MAC using the eNS distribution service. This eNS update includes a flag indicating that this is an FCoE VN_Port MAC, and rather than installing an entry in the L2 tables, each RB installs a 24 bit FCoE DA entry using the low order three bytes of the VN_Port FPMA MAC address as these correspond to the FC PID of the VN_Port. This allows any FCoE frame ingressing on any RB in the fabric, destined to the VN_Port, to be directly forwarded to the egress RB, the RB to which the VN_Port is attached. Note that this entry is based on the egress RB and not the ingress RB. From the perspective pf the FC fabric, the VN_Port on the ingress RB will have all of the FCIDs which are provided to the various ENode VN_Ports as it is performing NPIV operations and passing the same FCID through. If the ingress RB provided this information for inclusion in the routing tables then all of the FCIDs would; actually be duplicated, once at the ingress RB and once at the egress RB, which might cause routing problems. As any FC device which is being addressed by the ENode will not have any entries in the 24 bit portion of the routing table and the ingress VN_Ports will not have entries in the 24 bit portion of the routing table, any frames directed to other ENode VN_Ports on the Ethernet Fabric will be able to unambiguously determine their route from the 24 bit table entries.

Upon establishment of an VN_Port to VF_Port link from an RB in the Ethernet Fabric to the FCF, the RB notifies all RBs in the Ethernet Fabric of the link establishment via the eNS distribution service. The link is identified by the FC Domain and Area assigned by the FC fabric to the RB VN_Port in response to the RB FLOGI.

Each RB installs an FCoE ACL entry to facilitate a 16 bit FC SID Domain, Area based lookup with the result being forward to the RB owning the VN_Port to FCF VF_Port link, or to the egress interface if this is the owning RB. It is noted that the lookup to determine if the packet is destined to a VN_Port or Enode connected to the Ethernet Fabric has precedence over these lookups which route the packet to the RB. As any FC device which is being addressed by the ENode will not have any entries in the 24 bit portion of the routing table and the ingress VN_Ports will not have entries in the 24 bit portion of the routing table, any frames not directed to other ENode VN_Ports on the Ethernet Fabric will be able to determine their route from the 16 bit table entries as there are no 24 bit entries.

With these two sets of entries, lower 24 bits of FCoE DA for each connected ENode and 16 bit Domain, Area for each FCF-connected VN_Port, added to the normal Ethernet Fabric routing tables, in the Ethernet Name Server and other tables in the switch as described in Publication No. 2011/0299535 incorporated above, all FCoE packets from ENodes or FC packets from the FC fabric can be properly routed to the correct egress port of the Ethernet Fabric.

Figure 3A:
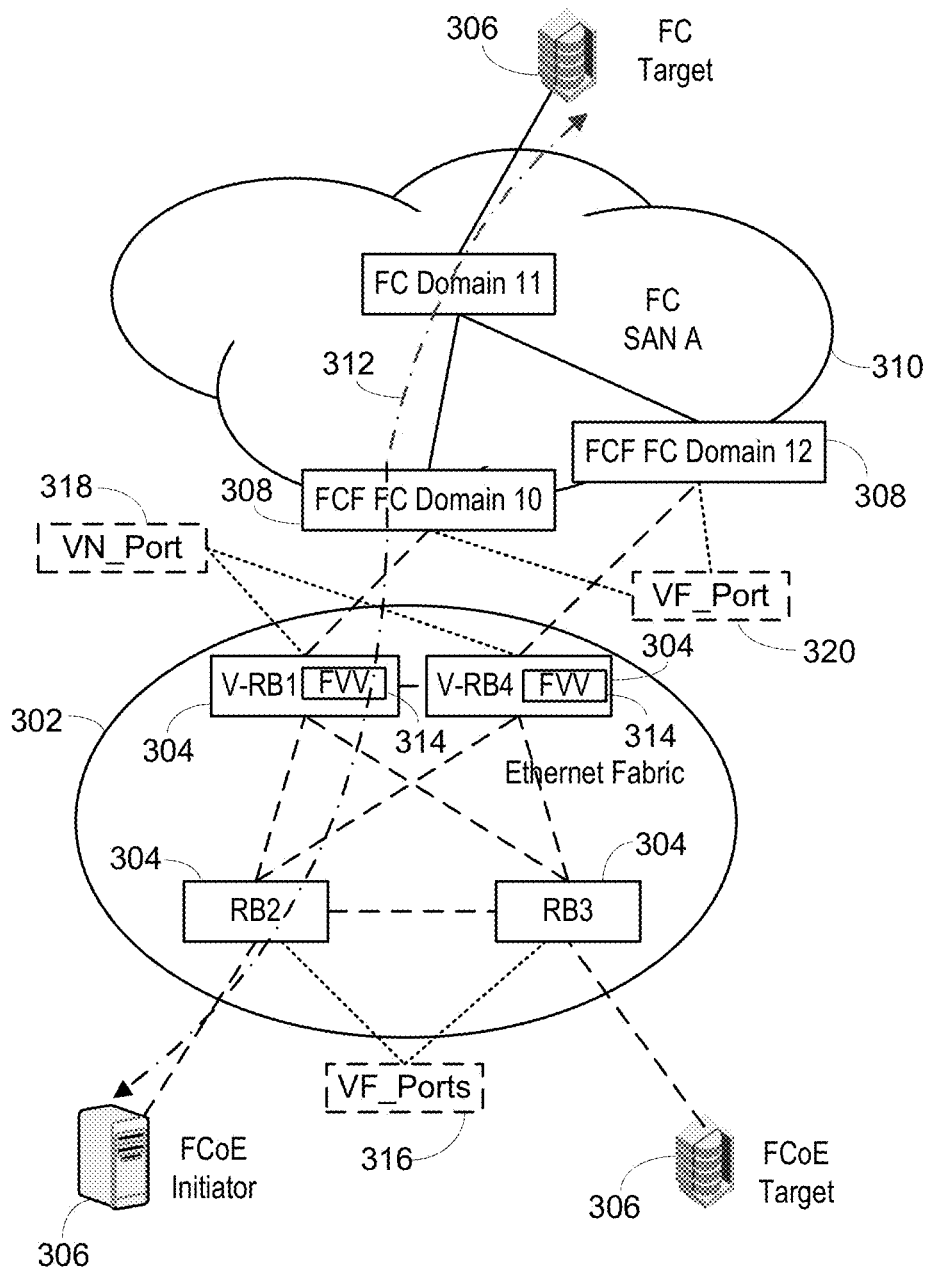
FIG. 3A is a redundant version of the network of FIG. 12.

FIG. 3A illustrates a redundant path version of the network of FIG. 3. V-RB1 and V-RB4 304 provide redundant access to the FC SAN A 310 through the parallel connections to FCFs FC Domains 10 and 12 308. V-RB1 304 is a primary VN_Port virtualizer and V-RB4 304 is a non-primary VN_Port virtualizer. Device login is done using the primary, V-RB1 304 in the example. When the primary fails, the non-primary takes over operation and provides a redundant path to the FC SAN A 310. In certain embodiments the failover may be seamless, as the non-primary may perform address translation. In other embodiments the failover can be accomplished using conventional failover mechanisms utilizing different addresses. Rerouting inside the Ethernet Fabric 302 is handled using conventional TRILL failover techniques.

Figure 4:
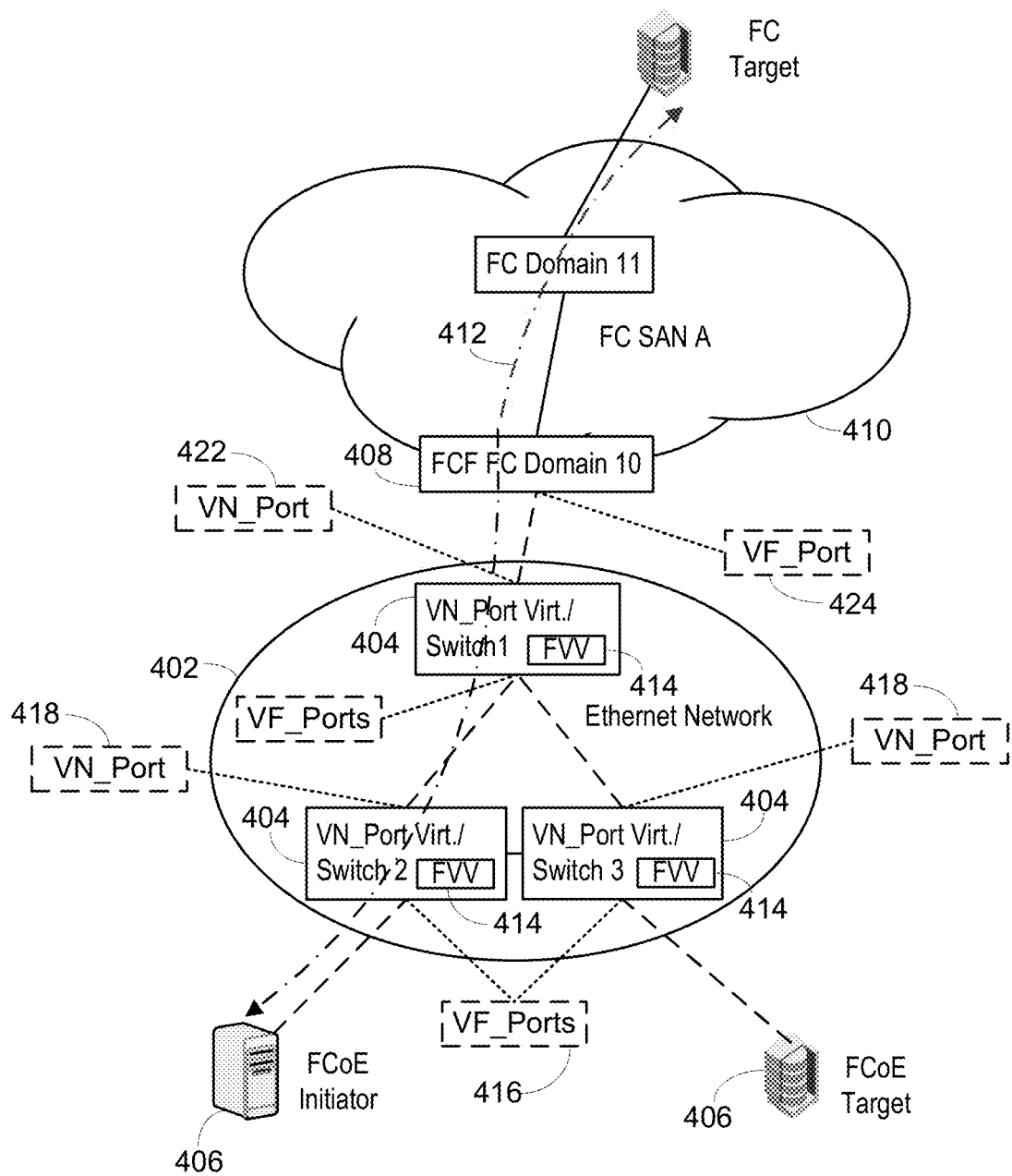
FIG. 4 is a block diagram of a network illustrating operation of three connected FCoE VN_Port virtualizers according to the present invention.

FIG. 4 is an alternate embodiment having a more conventional Ethernet network instead of an Ethernet Fabric. As such, individual switches 404 which each include FVV functionality 414 are interconnected to form the network 402. As such, each switch 404 performs the operations described above independently, not as a distributed unit as done in the Ethernet Fabric 302 with the RBs 304. However, preferably a service equivalent to the eNS service is utilized to allow direct Enode to Enode routing as discussed above. The illustrated embodiment switch 1 404 performs the initial login to the FCF Domain 10 408 and receives the base FC address for the network 402. Switch 2 404 and switch 3 404 each perform their own base login through switch 1 404, which converts the FIP FLOGIs to FIP FDISCs. Thus the base addresses for switches 2 and 3 404 are addresses based on the switch 1 404 base address. As each Enode device 406 performs its own FIP FLOGI, the switches 2 and 3 404 convert them to a FIP FDISC and sends them to switch 1 404, which passes them through to the FCF FC Domain 10 408. FCF FC Domain 10 408 then provides another FCID, which trickles back down to the requesting ENode device 406. It is noted in this configuration that consecutive FCIDs may not go to ENode devices 406 on the same switch, such as switch 2 404 or switch 3 404, as the FCF FC Domain 10 408 will provide addresses to switch 1 404 unaware of the underlying topology of the network 402. As the switches 404 preferably have full tables as discussed above with regard to the RBs, this is not a problem. It is understood that each switch in this case may not be able to receive a full complement of FCIDs as the total FCIDs provided through a single VN_Port 422 of switch 1 404 is distributed among the three switches illustrated.

Figure 5:
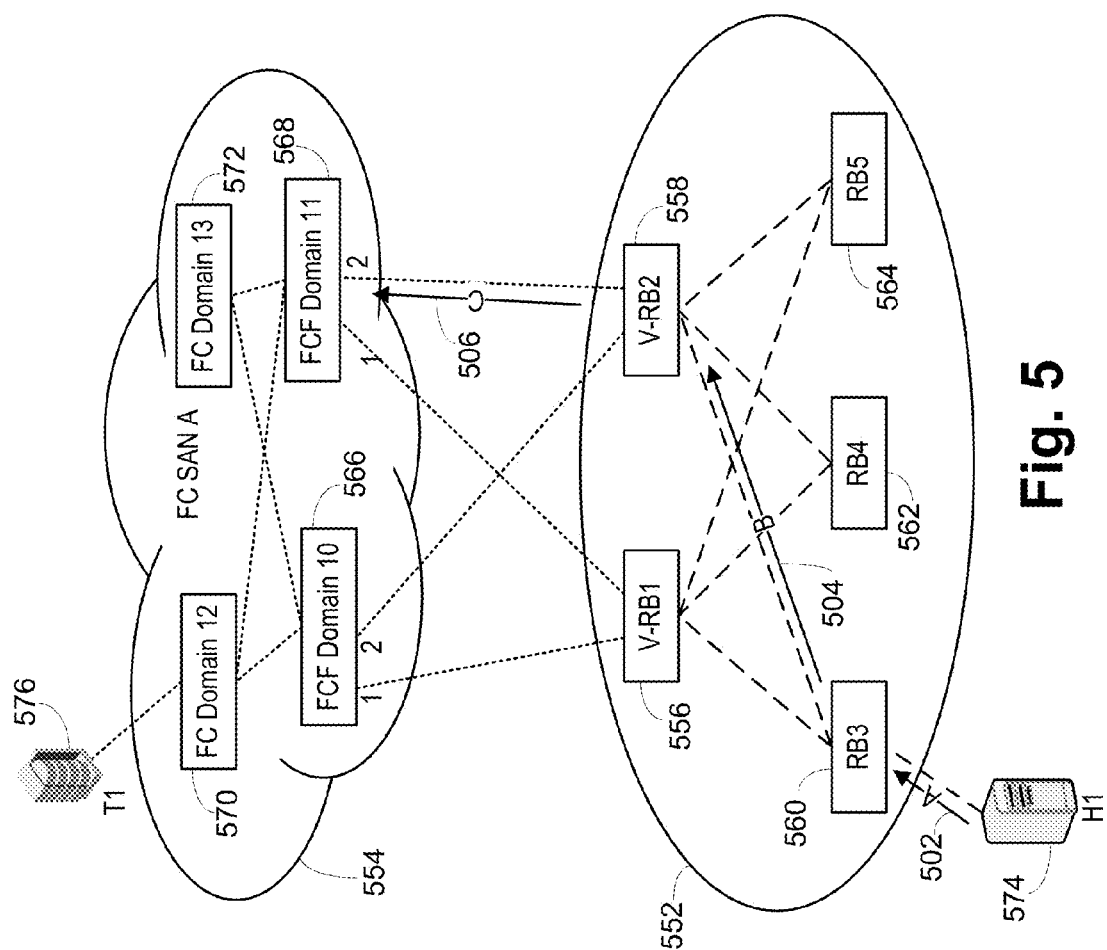
FIG. 5 is a block diagram illustrating FCoE VF_Port to FCoE VN_Port operations according to the present invention.
Figure 6:
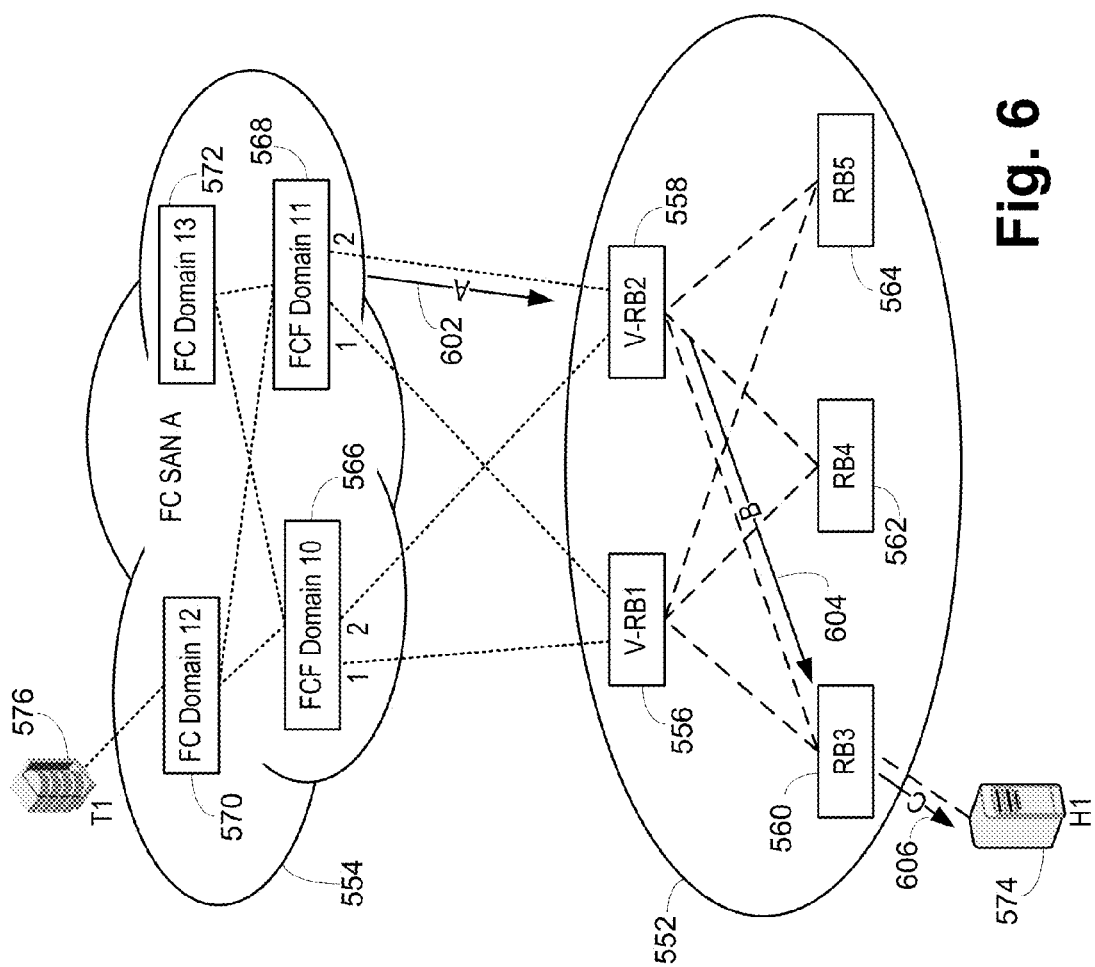
FIG. 6 is a block diagram illustrating FCoE VN_Port to FCoE VF_Port operations according to the present invention.
Figure 7:
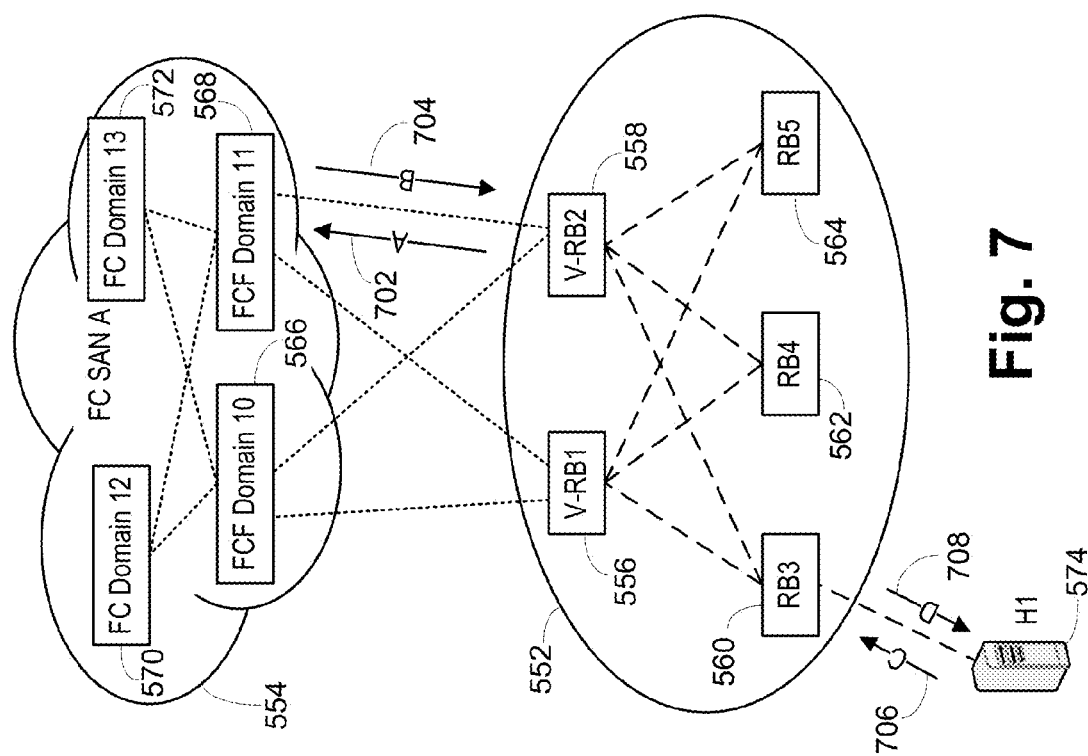
FIG. 7 is a block diagram illustrating FIP Discovery operations according to the present invention.
Figure 8:
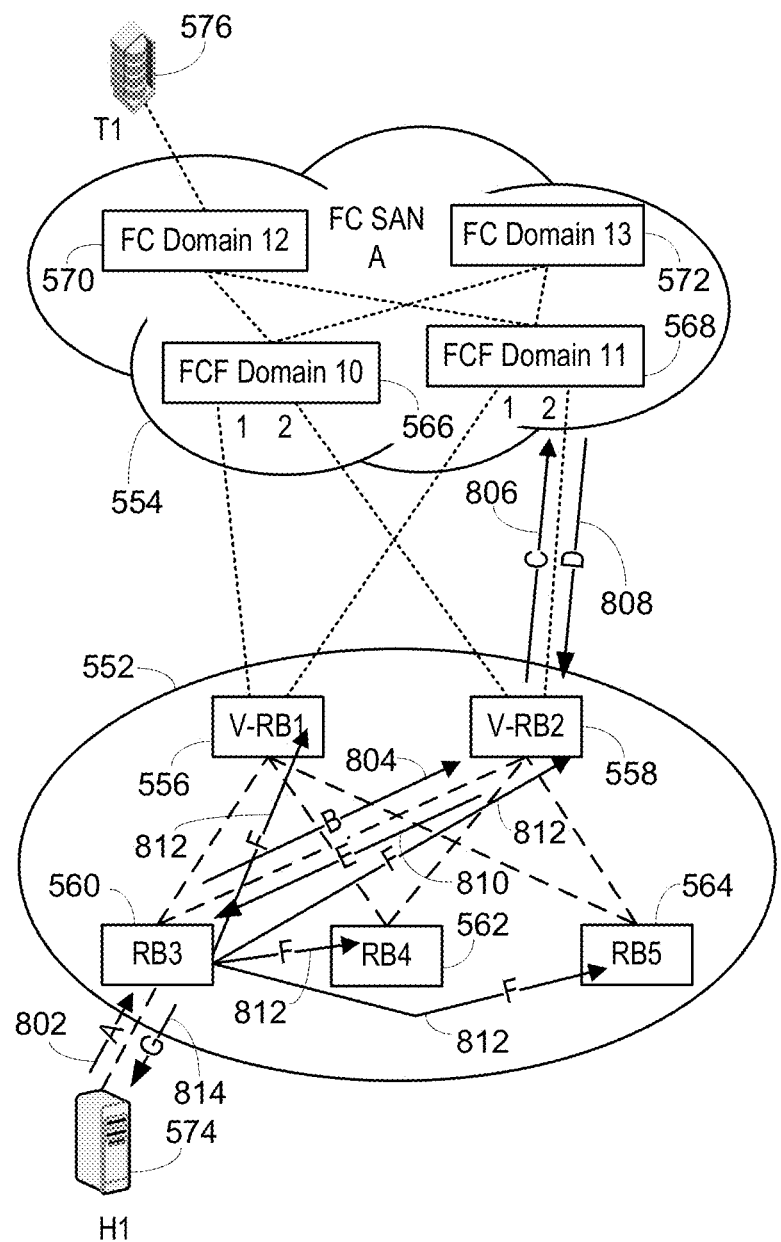
FIG. 8 is a block diagram illustrating FIP VLI operations according to the present invention.

FIGS. 5 and 6 illustrate data flow for two cases, respectively FCoE host to FC target and FC target to FCoE host. FIG. 7 illustrates the FIP VLAN and FIP FCF discovery operations for both an RB connected to an FCF and for Enode devices connected to an RB. FIG. 8 illustrates the FIP FLOGI or FDISC operations.

Referring to FIG. 5, an exemplary network architecture is illustrated. An Ethernet Fabric 552 is connected to an FC SAN 554. The Ethernet Fabric 552 includes various interconnected switches. Switch V-RB 1 556 is connected to switch V-RB2 558. Switch V-RB1 556 and switch V-RB2 558 include FVV functionality as indicated by the V-designation. Switch V-RB1 556 and switch V-RB2 558 also act as RBridges in the Ethernet Fabric as indicated by the RB designation. Switches RB3 560, RB4 562 and RB5 564 are each connected to each of switches V-RB1 556 and V-RB2 558 to form the Ethernet Fabric 552.

The FC SAN 554 is formed by FCFs 566 and 568 and FC switches 570 and 572, each switch including exemplary domain values. FCFs 566 and 568 are shown as each having two ports for connection to the Ethernet Fabric 552, with port 1 being connected to switch V-RB1 556 and port 2 being connected to switch V-RB2 558. An FCoE host H1 574 is shown connected to switch RB3 560, while FC target T1 576 is shown as connected to switch 570, which has domain 12. This basic illustrated architecture is used in variations in FIGS. 5-8 to illustrate packet flow in various situations.

In FIG. 5 data flow from FCoE host H1 574 to FC target T1 576 is illustrated. Assume FCoE host H1 574 is logged into FCF Domain 11 568, port (area) 2. Also assume there is a single external FCF MAC for the Ethernet Fabric 552 which is programmed as a "Ext FCF MAC" on all RBridges in the Ethernet Fabric 552. Use of "Ext FCF MAC" is proper as each ENode believe that it is connected to an FCF. Further assume that the Ethernet Fabric switches 556-564 each use an individual, internal FVV MAC value for ingress RBridge to egress RBridge/AG FCoE traffic. FCoE host H1 574 provides an FCoE packet to switch RB3 560 as illustrated by the arrow A 502. The FCoE packet has the following values: DA: Ext FCF MAC, SA: H1 VN FPMA MAC, VID: FCoE VLAN, DID: T1 FCID and SID: H1 FCID.

Switch RB3 560 performs the following processing on the packet:

1. Promote to L3 (Because DA=Ext FCF MAC). The promotion to L3 results in using different fields for routing, in this case either the DID or SID fields in the embedded packet.
2. 24 bit DID lookup=miss (because the destination is not an FCoE device connected to the Ethernet Fabric 552)
3. 16 bit SID lookup=hit (because it is a known FC device), result=forward to switch V-RB2 558 (because of routing table entry)
4. Trill forward to switch V-RB2 558 (normal Ethernet Fabric operation)

The Ethernet Fabric packet is forwarded from switch RB3 560 to switch V-RB2 558 as illustrated by arrow B 504. The packet has the following values: TRILL DA=V-RB2, TRILL SA=RB3, Inner DA=V-RB2 Int FVV MAC, Inner SA=RB3 Int FVV MAC, VID=FCoE VLAN, DID=T1 FCID and SID=H1 FCID.

Switch V-RB2 458 performs the following processing on the packet:

1. Terminate TRILL (because TRILL DA=V-RB2)
2. Promote to L3 (because DA=My Int FVV MAC)
3. 24 bit DID lookup=miss (because the destination is not an FCoE device connected to the Ethernet Fabric 452)
4 16 bit SID lookup=hit (because it is a known FC domain and area), result=forward to V-RB2 558 FCF (EGID) (because of routing table entry)

The FCoE packet is provided from switch V-RB2 558 to port 2 of FCF 568 as illustrated by arrow C 506. The FCoE packet has the following values: DA: FCF 11 MAC, SA: V-RB2 VN FPMA MAC, VID: FCoE VLAN, DID=T1 FCID and SID=H1 FCID. Flow inside the FC SAN 554 is as normal and is not illustrated.

Table 1 provides the above operations and flow in table format.

TABLE 1

Data Flow FCoE $H_1$ to FC $T_1$
Assumes $H_1$ logged into FCF Domain 11, port (area) 2
$H_1$->$RB_3$ (Arrow A):
DA: Ext FCF MAC
SA: $H_1$ VN FPMA MAC
VID: FCoE VLAN
DID: $T_1$ FCID
SID: $H_1$ FCID
$RB_3$ processing:
1. Promote to $L_3$ (DA = Ext FCF MAC)
2. 24 bit DID lookup = miss
3. 16 bit SID lookup = hit, result = forward to V-$RB_2$
4. TRILL forward to V-$RB_2$
$RB_3$->V-$RB_2$ (Arrow B):
TRILL DA = V-$RB_2$
TRILL SA = $RB_3$
Inner DA = V-$RB_2$ Int FVV MAC
Inner SA = $RB_3$ Int FVV MAC
VID = FCoE VLAN
DID = $T_1$ FCiD
SID = $H_1$ FCID
V-$RB_2$ processing:
1. Terminate TRILL (TRILL DA = V-$RB_2$)
2. Promote to $L_3$ (DA = My Int FVV MAC)
3. 24 bit DID lookup = miss TABLE 1-continued 4 16 bit SID lookup = hit, result = forward to FCF (EGID)
V-RB$_2$->FCF 11 (Arrow C):
DA: FCF 11 MAC
SA: V-RB$_2$ VN FPMA MAC
VID: FCoE VLN
DID = T$_1$ FCiD
SID = H$_1$ FCID
FCF 11 & FC Fabric: Normal FC forwarding to T$_1$ Notes:
1. Single external FVV MAC for Ethernet Fabric. Programmed as a "Ext FCF MAC" on all RBs in Ethernet Fabric.
2. Ethernet Fabric switches use internal FVV MAC for ingress RB to egress RB/AG FCoE traffic.

Referring to FIG. 6, data flow from FC target T1 576 to FCoE host H1 574 is illustrated. Again assume FCoE host H1 574 is logged into FC domain 11, port (area) 2. Normal FC forwarding occurs on the FC packet from FC target T1 576 to FCF 568, domain 11, port 2. Because FCF 568 assumes the FCoE host H1 is connected through port 2, the FCoE packet flows from FCF 568 to switch V-RB2 558 as shown by arrow A 602. The FCoE packet has the following values: DA: V-RB2 VN FPMA MAC, SA: FCF 11 MAC, VID: FCoE VLAN, DID=H1 FCID and SID=T1 FCID.

Switch V-RB2 558 performs the following processing on the packet:
1. Promote to L3 (Because DA=My VN FPMA MAC)
3. 24 bit DID lookup=hit (because the destination is an FCoE device connected to the Ethernet Fabric 552), result=forward to RB3 560 (because of the routing table entry)

The Ethernet Fabric packet is provided from switch V-RB2 558 to switch RB3 560 as illustrated by arrow B 604. The Ethernet Fabric packet has the following values: TRILL DA=RB3, TRILL SA=V-RB2, Inner DA=RB3 Int FVV MAC, Inner SA=V-RB2 Int FVV MAC, VID=FCoE VLAN, DID=H1 FCID and SID=T1 FCID.

Switch RB3 560 performs the following processing:
1. Terminate TRILL (Because TRILL DA=RB3)
2. Promote to L3 (Because DA=RB3 Int FVV MAC)
3. 24 bit SID lookup=hit (because the destination is an FCoE device connected to the Ethernet Fabric 452), result=forward to H1 (EGID) (because of the routing table entry)

The FCoE packet is provided from switch RB3 560 to FCoE host H1 574 illustrated by arrow C 606. The FCoE packet has the following values: DA: H1 VN FPMA MAC, SA: Ext FCF MAC, VID: FCoE VLAN, DID: H1 FCID and SID: T1 FCID.

Table 2 provides the above operations and flow in table format.

TABLE 2

Data Flow FCoE H$_1$ to FC T$_1$
Assumes H$_1$ logged into FCF Domain 11, port (area) 2
H$_1$->RB$_3$ (Arrow A):
DA: Ext FCF MAC
SA: H$_1$ VN FPMA MAC
VID: FCoE VLAN
DID: T$_1$ FCID
SID: H$_1$ FCID
RB$_3$ processing:
1. Promote to L$_3$ (DA = Ext FCF MAC)
2. 24 bit DID lookup = miss
3. 16 bit SID lookup = hit, result = forward to V-RB$_2$
4. TRILL forward to V-RB$_2$
RB$_3$->V-RB$_2$ (Arrow B):
TRILL DA = V-RB$_2$
TRILL SA = RB$_3$ TABLE 2-continued Inner DA = V-RB$_2$ Int FVV MAC
Inner SA = RB$_3$ Int FVV MAC
VID = FCoE VLAN
DID = T$_1$ FCiD
SID = H$_1$ FCID
V-RB$_2$ processing:
1. Terminate TRILL (TRILL DA = V-RB$_2$)
2. Promote to L$_3$ (DA = My Int FVV MAC)
3. 24 bit DID lookup = miss
4 16 bit SID lookup = hit, result = forward to FCF (EGID)
V-RB$_2$->FCF 11 (Arrow C):
DA: FCF 11 MAC
SA: V-RB$_2$ VN FPMA MAC
VID: FCoE VLN
DID = T$_1$ FCiD
SID = H$_1$ FCID
FCF 11 & FC Fabric: Normal FC forwarding to T$_1$ Notes:
1. Single external FVV MAC for Ethernet Fabric. Programmed as a "Ext FCF MAC" on all RBs in Ethernet Fabric.
2. Ethernet Fabric switches use internal FVV MAC for ingress RB to egress RB/AG FCoE traffic.

FIG. 7 illustrates the FIP VLAN and FIP FCF discovery operations for both the switch V-RB2 558 and for host H1 574.

Addressing the switch V-RB2 558 first, first FIP VLAN discovery occurs, then FIP Discovery. Switch V-RB2 558 transmits a FIP VLAN Request to the FCF Domain 11 568 as shown by arrow A 702. The FIP VLAN Request packet has the following values: DA: ALL_FCFs_MAC, SA: V-RB2 ENode MAC and VID: Any valid VLAN. The FCF 568 performs normal FCF processing and returns a response as shown by arrow B 704. The FIP VLAN Notification packet has the following values: DA: V-RB2 ENode MAC, SA: FCF 11 MAC and VID: Same as Request.

The switch V-RB2 558 next performs FIP Discovery. The FIP Discovery Solicitation packet flows to FCF 568 as shown by arrow A 702. The FIP Discovery Solicitation packet has the following values: DA: ALL_FCFs_MAC, SA: V-RB2 ENode MAC and VID: FCoE VLAN. Again the FCF 568 performs normal processing and returns a FIP Solicited Advertisement packet as shown by arrow B 704. The FIP Solicited Advertisement packet has the following values: DA: V-RB2 ENode MAC, SA: FCF 11 FCF MAC and VID: FCoE VLAN.

Proceeding to the host H1 574, the FIP Request is provided from FCoE host H1 574 to switch RB3 560 as shown by arrow C 706. The FIP Request packet has the following values: DA: ALL_FCFs_MAC, SA: H1 ENode MAC and VID: Any valid VLAN.

Switch RB3 560 performs the following processing:
1. Trap to CP (because it is a FIP packet)
2. CP generates FIP VLAN Notification (because it is acting as the FCF entity)

The FIP Notification flows from switch RB3 560 to FCoE host H1 574 as shown by arrow D 708. The FIP Notification packet has the following values: DA: H1 ENode MAC, SA: Ext FCF MAC and VID: Same as Request.

For FIP Discovery, the FIP Solicitation packet flows from FCoE host H1 574 to switch RB3 560 as shown by arrow C 706. The FIP Discovery packet has the following values: DA: ALL_FCFs_MAC, SA: H1 ENode MAC and VID: FCoE VLAN.

Switch RB3 560 performs the following processing:
1. Trap to CP (because it is a FIP packet)
2. CP generates FIP Solicited Advertisement (because it is acting as the FCF entity)

The FIP Solicited Advertisement packet flows from switch RB3 560 to FCoE host H1 574 as shown by arrow D 708. The FIP Solicited Advertisement packet has the following values: DA: H1 ENode MAC, SA: Ext FCF MAC and VID: FCoE VLAN.

Tables 3 and 4 provide the above operations and flow in table format.

TABLE 3

V-RB$_2$
FIP VLAN Discovery
Request - V-RB$_2$->FCF 11 (Arrow A):
DA: ALL_FCFs_MAC
SA: V-RB$_2$ ENode MAC
VID: Any valid VLAN
FCF - Normal processing
Notification - FCF 11->V-RB$_2$ (Arrow B):
DA: V-RB$_2$ ENode MAC
SA: FCF 11 MAC
VID: Same as Request
------
FIP Discovery
Solicitation - V-RB$_2$->FCF 11 (Arrow A):
DA: ALL_FCFs_MAC
SA: V-RB$_2$ ENode MAC
VID: FCoE VLAN
FCF - Normal processing
Solicited Advertisement - FCF 11->V-RB$_2$ (Arrow B):
DA: V-RB$_2$ ENode MAC
SA: FCF 11 FCF MAC
VID: FCoE VLAN Notes:
1. Single external FVV MAC for Ethernet Fabric. Programmed as a "Ext FCF MAC" on all RBs in Ethernet Fabric.
2. Ethernet Fabric switches use computed internal FVV MAC for ingress RB to egress RB/AG FCoE traffic.

TABLE 4

H$_1$
FIP VLAN Discovery
Request - H$_1$->RB$_3$ (Arrow C):
DA: ALL_FCFs_MAC
SA: H$_1$ ENode MAC
VID: Any valid VLAN
RB$_3$ processing:
1. Trap to CP
2. CP generates FIP VLAN Notification
Notification - RB$_3$->H$_1$ (Arrow D):
DA: H$_1$ ENode MAC
SA: Ext FCF MAC
VID: Same as Request
------
FIP Discovery
Solicitation - H$_1$->RB$_3$ (Arrow C):
DA: ALL_FCFs_MAC
SA: H$_1$ ENode MAC
VID: FCoE VLAN
RB$_3$ processing:
1. Trap to CP
2. CP generates FIP Solicited Advertisement
Solicited Advertisement - RB$_3$->H$_1$ (Arrow D):
DA: H$_1$ ENode MAC
SA: Ext FCF MAC
VID: FCoE VLAN Notes:
1. Single external FVV MAC for Ethernet Fabric. Programmed as a "Ext FCF MAC" on all RBs in Ethernet Fabric.
2. Ethernet Fabric switches use computed internal FVV MAC for ingress RB to egress RB/AG FCoE traffic.

FIG. 8, illustrates the FIP FLOGI or FDISC operations. The FIP Virtual Link Instantiation (VLI) Login (FLOGI or FDISC) operations are as follows. Assume that FCOE host H1 574 is logging into FC Domain 11, Port 2 on FCF 568. The FIP VLI Request packet flows from FCoE host H1 574 to switch RB3 560 as shown by arrow A 802. The FIP VLI Request packet has the following values: DA: Ext FCF MAC, SA: H1 ENode MAC, VID: FCoE VLAN, DID: FFFFFE and SID: 000000.

The switch RB3 560 performs the following processing:
1. Trap to CP (because it is a FIP packet as determined by an FIP Ethernet type trap)
2. Use Login Management as described below to determine egress V-RB for the packet
3. TRILL forward to egress RB (normal TRILL forwarding)

The TRILL packet flows from switch RB3 560 to switch V-RB2 558 as shown by arrow B 804. The TRILL packet has the following values: TRILL DA=V-RB2, TRILL SA=RB3, Inner DA=V-RB2 int FVV MAC, Inner SA=H1 ENode MAC, VID=FCoE VLAN, DID: FFFFFE and SID: 000000.

As switch G-RB2 558 is acting as the FVV functionality, it performs the following login processing:
1. Normal FCoE gateway FLOGI/FDISC processing (with the switch V-RB2 558 presenting as an FCoE VN_Port, most preferably a port that has NPIV or Virtual N_Port capabilities). In this case the switch V-RB2 558 converts the FIP FLOGI to a FIP FDISC.

Thus the FIP FDISC flows from the switch V-RB2 458 to FCF 468 (FC Domain 11) as shown by arrow C 806.

FCF 568 responds to the FIP FDISC from switch V-RB2 558 by returning either a FIP VLI LS-ACC (successful login) or LS-RJT as shown by arrow D 808.

Switch V-RB2 558 simply passes the FIP FDISC response directly through, just performing TRILL operations. In this case the switch V-RB2 558 provides the FIP Response packet to switch RB3 560 as shown by arrow E 810. The TRILL packet has the following values: TRILL DA=RB3, TRILL SA=V-RB2, Inner DA=H1 Enode MAC, Inner SA=RB2 Int FVV MAC, VID=FCoE VLAN, DID=H1 FCID, SID=FFFFFE Switch RB3 560 performs the following response processing:
1. Trap to CP (because it is a FIP packet as determined by an FIP Ethernet type trap)
2. Decode response
3a: If Link Service Accept (LS_ACC), send eNS update to all RBs If the response is an LS_ACC, then switch RB3 560 provides an eNS notification to all RBs as shown by arrows F 812.

All RBs perform the following response to the eNS notification:
3a.1. Normal MAC address update processing
3a.2. New FCoE VN_Port processing. Each RB adds an FCoE EXM entry using low order 3 bytes of VN_Port MAC address as FCID to indicate presence of ENode on the Ethernet Fabric 552.
4. Forward response to H1 574

The FIP VLI Response flows from switch RB3 560 to ENode host H1 574 as shown by arrow G 814. This FCoE FIP packet has the following values: DA: H1 ENode MAC, SA: Ext FCF MAC, VID: FCoE VLAN, DID=H1 FCID, SID=FFFFFE.

Table 5 provides the above operations and flow in table format.

TABLE 5

FIP VLI Login (FLOGI or FDISC)
Assume H$_1$ logging into FCF Domain 11, Port 2
VLI Request - H$_1$->RB$_3$ (Arrow A):
DA: Ext FCF MAC TABLE 5-continued

```
SA: H₁ ENode MAC
VID: FCoE VLAN
DID: FFFFFE
SID: 000000
RB₃ processing:
1. Trap to CP (FIP etype trap)
2. Use Login Mgmt to determine egress RB
3. TRILL forward to egress RB
RB₃->V-RB₂ (Arrow B):
TRILL DA = V-RB₂
TRILL SA = RB₃
Inner DA = V-RB₂ Int FVV MAC
Inner SA = H₁ ENode MAC
VID = FCoE VLAN
DID: FFFFFE
SID: 000000
V-RB₂ processing:
1. Trap to CP
2. Virtualizer function converts FLOGI to FDISC
VLI Request - V-RB₂->FCF Domain 11 Arrow C):
DA: FCF 11 MAC
SA: V-RB₂ ENode MAC
VID: FCoE VLAN
DID: FFFFFE
SID: 000000
FCF 11 Processing - Normal processing
FCF 11->V-RB₂ (Arrow D):
VLI Response LS-ACC (successful login) or
FC LS-RJT
V-RB₂ response processing:
1. Pass through
V-RB₂->RB₃ (Arrow E)
TRILL DA = RB₃
TRILL SA = V-RB₂
Inner DA = H₁ ENode MAC
Inner SA = V-RB₂ Int FVV MAC
VID = FCoE VLAN
DID: H₁ FCID
SID: FFFFFE
RB₃ response processing
1. Trap to CP (FIP etype trap)
2. Decode reponse
3a: If LS_ACC, send eNS update to all RBs (Arrow F)
All RBs:
3a.1. Normal MAC addr update processing
3a.2. New FCoE VN-port processing - add FCOE EXM entry
using low order 3 bytes of VN-port MAC address as FCID
Forward response to H₁
VLI Response - RB₃->H₁ (Arrow G):
DA: H₁ ENode MAC
SA: Ext FCF MAC
VID: FCoE VLAN
DID: H₁ FCID
SID: FFFFFE
```

Notes:
1. Single external FVV MAC for Ethernet Fabric. Programmed as a "Ext FCF MAC" on all RBs in Ethernet Fabric.
2. Ethernet Fabric switches use internal FW MAC for ingress RB to egress RB/AG FCoE traffic.

In a deployment where the FCF-connected RB is not at the first Ethernet Fabric hop, the first hop RB must decide to which FCF-connected RB it should forward FCoE Enode device FIP FLOGIs. In one embodiment an automatic method is used. In a second embodiment, a configurable FCoE login management model is used.

The automatic embodiment utilizes the eNS distribution services to provide updates from RBs to all other RBs with current Ethernet Fabric-FCF link usage information. If the FCF-connected RB is the first hop, then if a single logical FCoE VN_Port to VF_Port link is established on the FCF-connected RB, forward FIP FLOGI on it. If multiple logical FCoE VN_Port to VF_Port links are established on this FCF-connected RB, forward an Ethernet Fabric FIP FLOGI on the link with the least number of FCoE device logins per link bandwidth. If a FCF-connected RB is not the first hop, then send the FLOGI to the FCF-connected RB with the least number of Ethernet Fabric-FCF logins per total uplink bandwidth. Note that FDISC based login from the same ENode must be sent to the same FCF-connected RB and forwarded on the same VN_Port to VF_Port link, so the ENode to FCF-connected RB association must be retained in the first hop non-FCF-connected RB.

The second embodiment provides the SAN administrator with a facility to map ENode devices to a specific Ethernet Fabric-FCF link, and therefore to a specific FC SAN Domain, Area. The resulting login management database is distributed to all RBs in the Ethernet Fabric.

Figure 9:
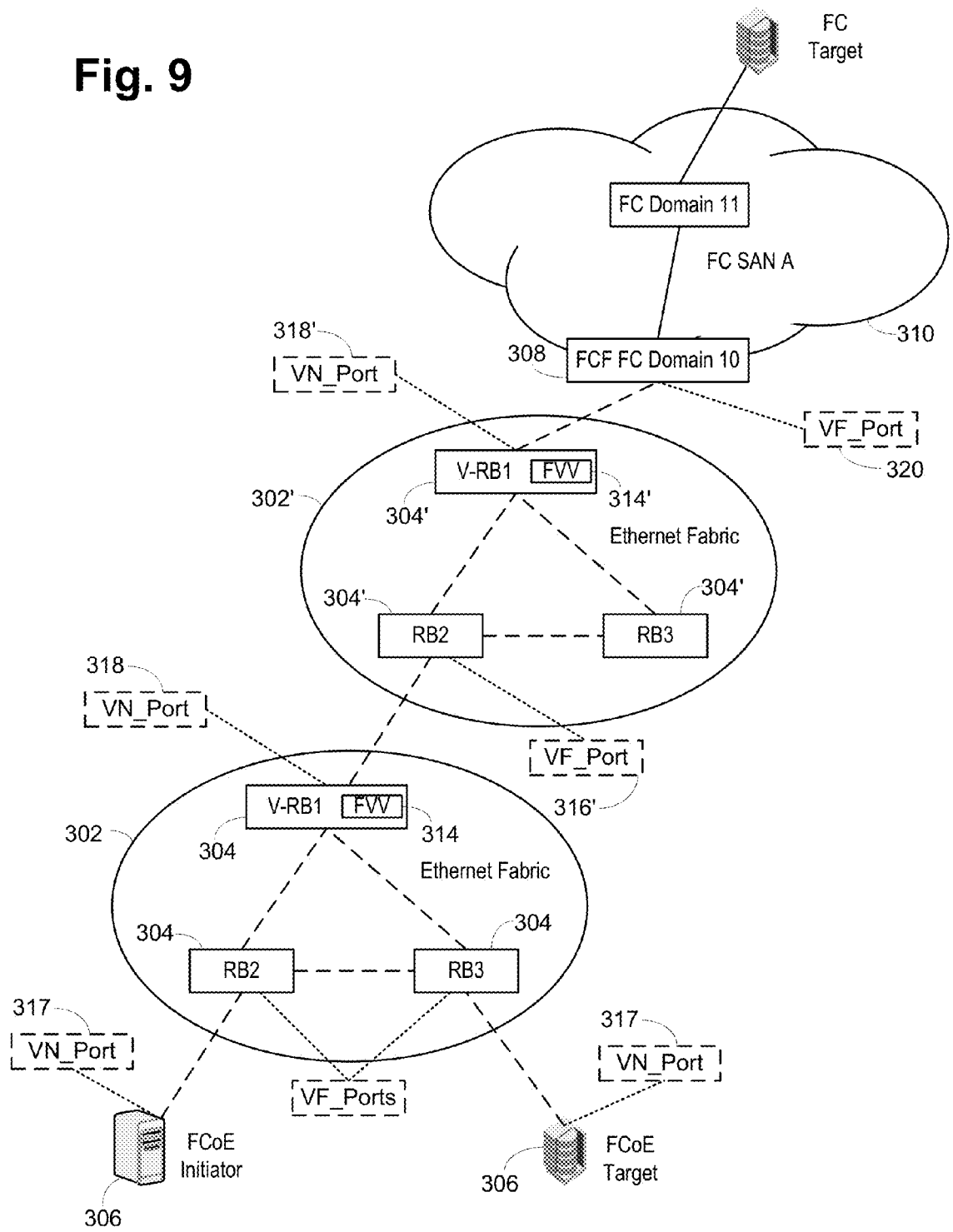
FIG. 9 is a block diagram illustrating cascading of Ethernet Fabrics according to the present invention.

FIG. 9 illustrates that the V-RB1 314 need not be directly connected to the FCF 308 but rather there can be an intervening Ethernet Fabric 302' between the VN_Port 318 and the VF_Port 320 of the FCF 308. Therefore the VN_Port 318 is connected to VF_Port 316' and the V-RB1 304' is connected to the VF_Port 320. This shows that the VN_Port 318 from the V-RB1 need not be connected to an FCF but can be connected to any device, in this case RB2 304', that presents a VF_Port. Ethernet Fabric 302, specifically V-RB1 304, handles virtualization and NPIV operations for ENodes 306, with Ethernet Fabric 302' performing virtualization and NPIV operations for its connected devices, in this case Ethernet Fabric 302. FCF 308 performs the normal functions for the ENodes 306, just virtualized a second level by Ethernet Fabric 302' as packets such as FIP VLI traverse the two Ethernet Fabrics 302 and 302'.

Figure 10:
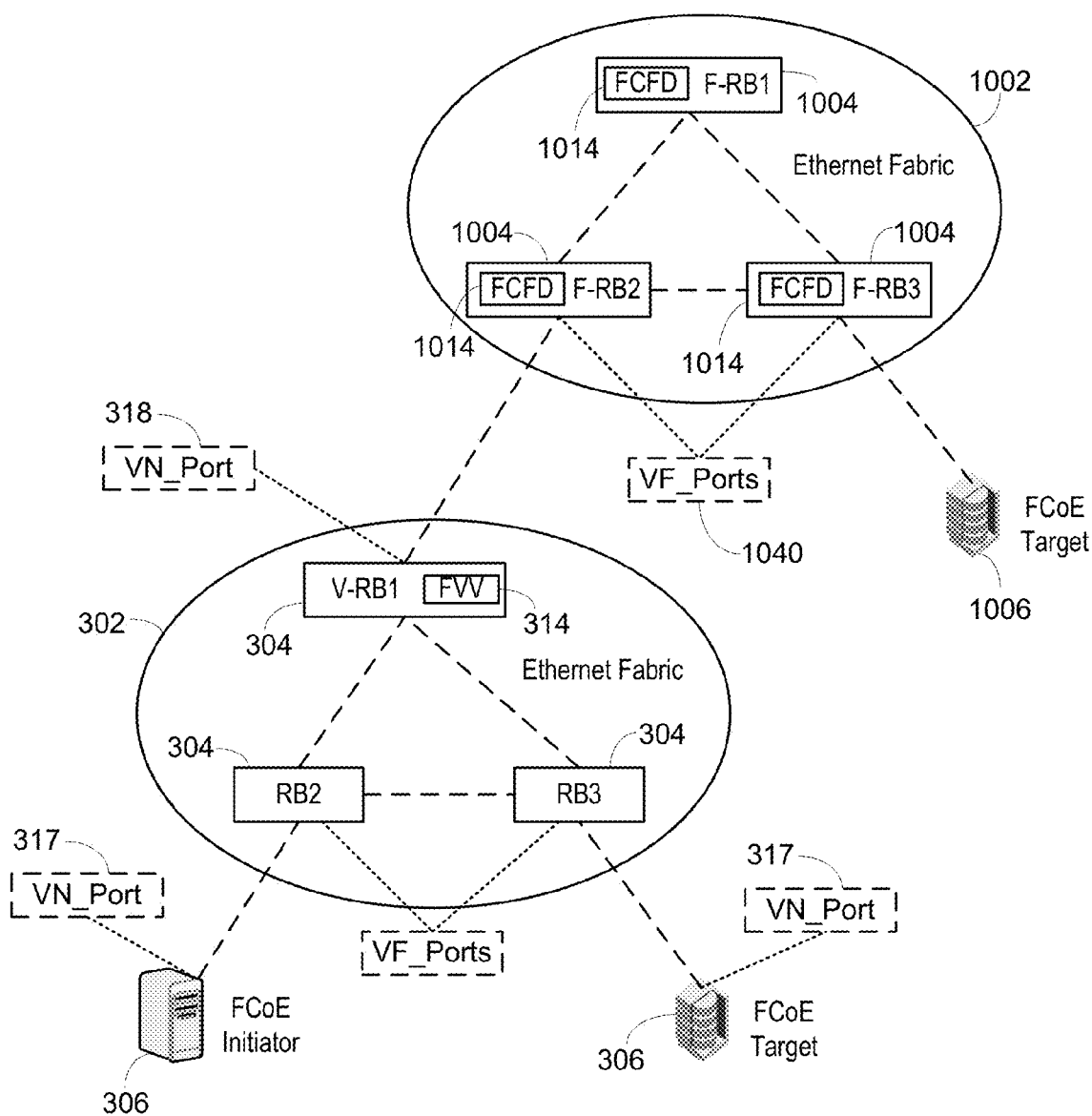
FIG. 10 is a block diagram of a first alternate embodiment of a network according to the present invention.

FIG. 10 illustrates a first alternate embodiment. Each RB 1004 in an Ethernet Fabric 1002 includes an FCF daemon 1014 (FCFD) and so is referred to as an F-RB. The FCF daemon 1014 provides all FC services normally provided by an FCF, which is sufficient to operate an FC fabric. In this embodiment each RB 1004 handles the login operations of its connected ENodes 1006 as it contains full FC services. eNS can be used as above to maintain the tables used for direct routing or similar FC inter-switch communications can be used, as those will be provided to allow the FCF daemons 1014 to operate as a normal FC fabric. The VF port 1040 of the F-RB2 1014 is connected to the VN_Port 318 of V-RB1 304 to act as the FCF instead of an actual FCF such as FCF 308. This is another example of the VN_Port 318 being connected to a VF_Port from a device other than an FCF, in this case F-RB2 1004. Thus the F-RB2 1004 handles the login of ENodes connected to the Ethernet Fabric 302 as the Ethernet Fabric 302 is operating as a virtual VN_Port virtualizer.

Figure 11:
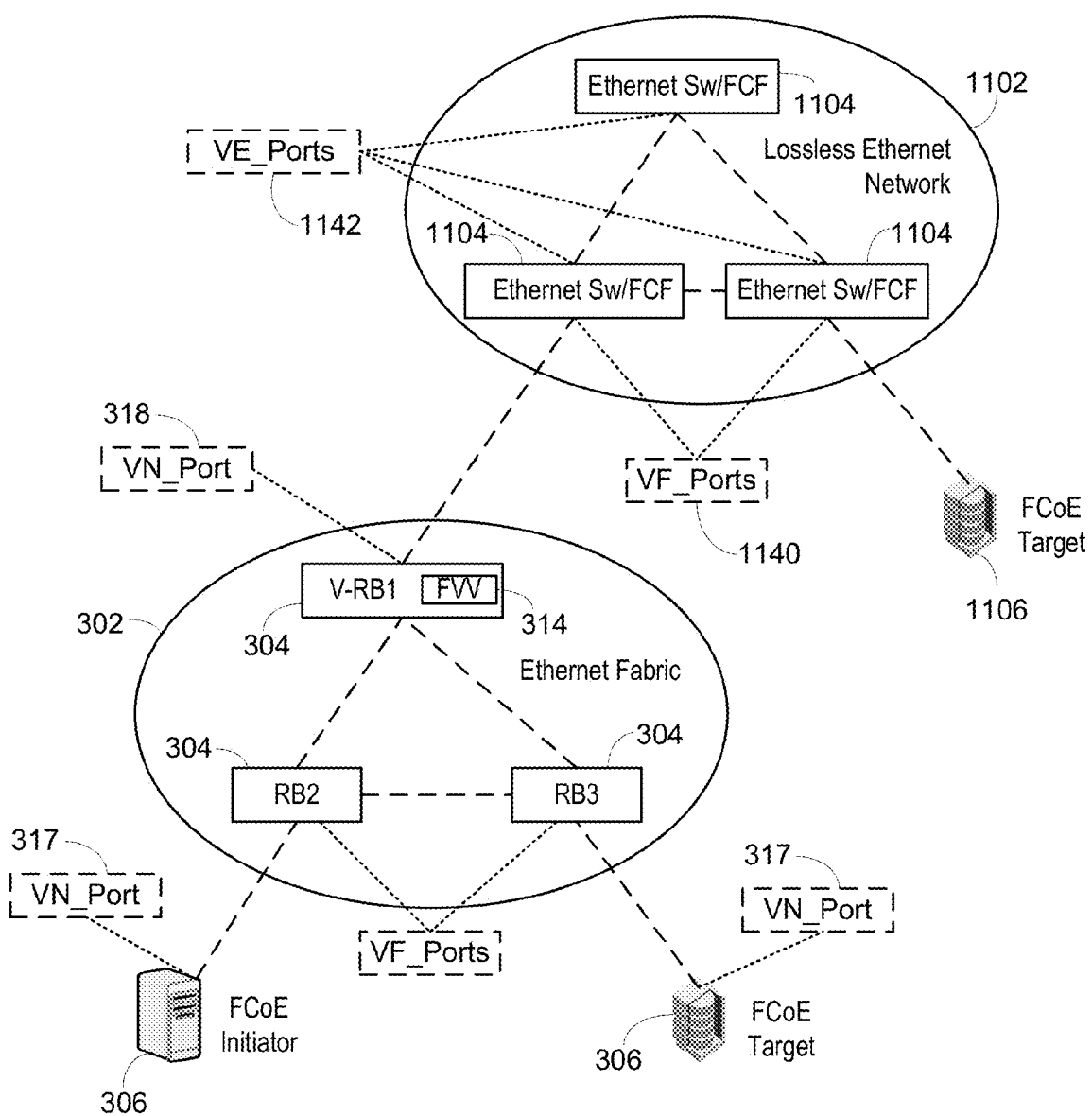
FIG. 11 is a block diagram of a second alternate embodiment of a network according to the present invention.

FIG. 11 is a second alternate embodiment. Instead of being an Ethernet Fabric, the network 1102 is a Lossless Ethernet network, as appropriate for FCoE operation. In the illustrated embodiment instead of RBs as used in the Ethernet Fabric, Ethernet switches 1104 are used, with the switches also complying with the requirements for an FCF. The switches/FCFs are connected using VE_Ports 1142 but still present VF_Ports to the Enode 1106 and the VN_Port 318 of the Ethernet Fabric 302 which is acting as the virtualizer. Thus here also each switch 1104 handles the login of connected Enodes and the virtualizer/Ethernet Fabric 302.

By embedding VN_Port virtualizer functionality into the switches or RBridges that form an Ethernet Fabric the entire Ethernet Fabric can act as a virtual VN_Port virtualizer, providing VF_Ports to the ENodes and VN_Ports to the FCF or other VF_Port device, and can route FCoE packets directly between connected ENode devices without a trip to the FC fabric.

While certain specific embodiments of particular functions have been mentioned, in most cases other similar embodiments that perform the same function can be used. For example, eNS is described as providing message distribution services between the Ethernet Fabric switches but other message distribution methods and protocols could be used. As another example, the VD is described as a user space module, language usually used with Linux/Unix variants, but it could be a kernel module in Linux/Unix or could be the equivalent in Windows, VxWorks and the like.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An Ethernet Fabric comprising:
a plurality of interconnected switches, at least one of said plurality of interconnected switches for connection to a Fibre Channel over Ethernet (FCoE) ENode, at least one of said plurality of interconnected switches for connection to a VF_Port, said at least one VF_Port-connected switch for connection to the VF_Port with a VN_Port and including FCoE VF_Port to VN_Port gateway functionality, each of said plurality of interconnected switches including a table for storage of all ENodes connected to the Ethernet Fabric and all VN_Ports connected to VF_Ports,
wherein all switches for connection to ENodes trap any FCoE Initialization Protocol (FIP) F Port Login (FLOGI) or Discover F Port Parameters (FDISC) Link Service Accept (LS_ACC) packet directed to a connected ENode, add a table entry of the connected ENode and inform all other switches in the Ethernet Fabric of the connected ENode address,
wherein all switches for connection to a VF_Port log into a Fibre Channel (FC) fabric through said VF_Port, add a table entry of the connected VN_Port and inform all other switches of the FC domain and area of the connected VN_Port,
wherein any switch connected to an ENode routes FCoE packets to the proper switch VN_Port based on domain and area values in said table,
wherein any switch connected to a VF_Port routes FCoE packets received from the VF_Port to the proper ENode based on addresses of ENodes in said table, and
wherein any switch connected to an ENode routes FCoE packets to the proper ENode based on addresses of ENodes in said table.

2. The Ethernet Fabric of claim 1, wherein any switch connected to an ENode generates responses to FIP Discovery requests and forwards FIP Virtual Link Instantiation (VLI) requests to an entity which provides FC addresses.

3. The Ethernet Fabric of claim 2, wherein the entity which provides FC addresses is a Fibre Channel Forwarder (FCF) so that the FIP VLI packets are routed to a switch coupled to an FCF.

4. The Ethernet Fabric of claim 1, wherein the VF_Port is provided by an FCF.

5. An Ethernet Fabric switch comprising:
a control processor;
an Ethernet port configured for Fibre Channel over Ethernet (FCoE) operation for connection to an ENode;
an Ethernet port configured for FCoE operation for connection to a VF_Port as a VN_Port;
an Ethernet Fabric port for connection to another Ethernet Fabric switch to allow development of an Ethernet Fabric;
an interconnect to connect said control processor, said Ethernet ENode port, said Ethernet Fabric port and said Ethernet VN_Port; and
routing table storage coupled to said control processor, said Ethernet ENode port, said Ethernet Fabric port and said Ethernet VN_Port,
wherein said control processor, said Ethernet ENode port, said Ethernet Fabric port and said Ethernet VN_Port cooperate to act as an FCoE VF_Port to VN_Port gateway,
wherein said control processor, said Ethernet ENode port, said Ethernet Fabric port and said Ethernet VN_Port cooperate as needed to trap any FCoE Initialization Protocol (FIP) F Port Login (FLOGI) or Discover F Port Parameters (FDISC) Link Service Accept (LS_ACC) directed to a connected ENode, add a table entry of the connected ENode and inform any other switches in the Ethernet Fabric of the connected ENode address,
wherein said control processor, said Ethernet Fabric port and said Ethernet VN_Port cooperate as needed to log into the Fibre Channel (FC) fabric through the VF_Port, add a table entry of the connected VN_Port and inform all other switches in the Ethernet Fabric of the FC domain and area of the connected VN_Port,
wherein said control processor, said Ethernet ENode port, said Ethernet Fabric port and said Ethernet VN_Port cooperate as needed to route FCoE packets to the proper VN_Port of a switch based on domain and area values in said table,
wherein said control processor, said Ethernet ENode port, said Ethernet Fabric port and said Ethernet VN_Port cooperate as needed to route FCoE packets received from the VF_Port to the proper ENode based on addresses of ENodes in said table, and
wherein said control processor, said Ethernet ENode port and said Ethernet Fabric port cooperate as needed to route FCoE packets to the proper ENode based on addresses of ENodes in said table.

6. The Ethernet Fabric switch of claim 5, said control processor, said Ethernet ENode port, said Ethernet Fabric port and said Ethernet VN_Port cooperate as needed to generate responses to FIP Discovery requests and forward FIP Virtual Link Instantiation (VLI) requests to the entity which provides FC addresses.

7. The Ethernet Fabric switch of claim 6, wherein the entity which provides FC addresses is a Fibre Channel Forwarder (FCF) so that the FIP VLI packets are routed to an Ethernet Fabric switch coupled to the FCF.

8. The Ethernet switch of claim 5, wherein the VF_Port is provided by an FCF.

9. A method of operating an Ethernet Fabric comprising:
interconnecting a plurality of switches, at least one of said plurality of interconnected switches for connection to a Fibre Channel over Ethernet (FCoE) ENode, at least one of said plurality of interconnected switches for connection to a VF_Port, said at least one VF_Port-connected switch for connection to the VF_Port with a VN_Port and including FCoE VF_Port to VN_Port gateway functionality, each of said plurality of interconnected switches including a table for storage of all ENodes connected to the Ethernet Fabric and all VN_Ports connected to VF_Ports,
trapping any FCoE Initialization Protocol (FIP) F Port Login (FLOGI) or Discover F Port Parameters (FDISC)

Link Service Accept (LS_ACC) packet directed to a connected ENode by all switches for connection to ENodes, adding a table entry of the connected ENode and informing all other switches in the Ethernet Fabric of the connected ENode address, logging into a Fibre Channel fabric through the VF_Port by all switches for connection to the VF_Port, adding a table entry of the connected VN_Port and informing all other switches of the FC domain and area of the connected VN_Port, routing FCoE packets to the proper switch VN_Port based on domain and area values in said table by any switch connected to an ENode, routing FCoE packets received from the VF_Port to the proper ENode based on addresses of ENodes in said table by any switch connected to a VF_Port, and routing FCoE packets to the proper ENode based on addresses of ENodes in said table by any switch connected to an ENode.

10. The method of claim 9, further comprising:

generating responses to FIP Discovery requests by any switch connected to an ENode; and forwarding FIP Virtual Link Instantiation (VLI) requests to an entity which provides FC addresses by any switch connected to an ENode.

11. The method of claim 10, wherein the entity which provides FC addresses is a Fibre Channel Forwarder (FCF) so that the FIP VLI packets are routed to a switch coupled to the FCF.

12. The method of claim 9, wherein the VF_Port is provided by an FCF.

13. A method of operating an Ethernet Fabric switch comprising:

acting as a Fibre Channel over Ethernet (FCoE) VF_Port to VN_Port gateway;

trapping any FCoE Initialization Protocol (FIP) F Port Login (FLOGI) or Discover F Port Parameters (FDISC) Link Service Accept (LS_ACC) packet directed to a connected ENode;

adding a routing table entry of the connected ENode;

informing any other switches in the Ethernet Fabric of the connected ENode address;

logging into a Fibre Channel (FC) fabric as a VN_Port;

adding a routing table entry of the connected VN_Port;

informing all other switches in the Ethernet Fabric of the FC domain and area of the connected VN_Port;

routing FCoE packets to the proper switch VN_Port based on domain and area values in said routing table;

routing FCoE packets received from the VF_Port to the proper ENode based on addresses of ENodes in said routing table; and routing FCoE packets to the proper ENode based on addresses of ENodes in said table.

14. The method of claim 13, further comprising:

generating responses to FIP Discovery requests; and forwarding FIP Virtual Link Instantiation (VLI) requests to an entity which provides FC addresses.

15. The method of claim 14, wherein the entity which provides FC addresses is a Fibre Channel Forwarder (FCF) so that the FIP VLI packets are routed to an Ethernet Fabric switch coupled to the FCF.

16. The method of claim 13, wherein the VF_Port is provided by an FCF.

* * * * *